April 29, 1958 H. L. PENBERTHY 2,832,958
METHOD FOR MANUFACTURING GLASS
Filed March 31, 1955
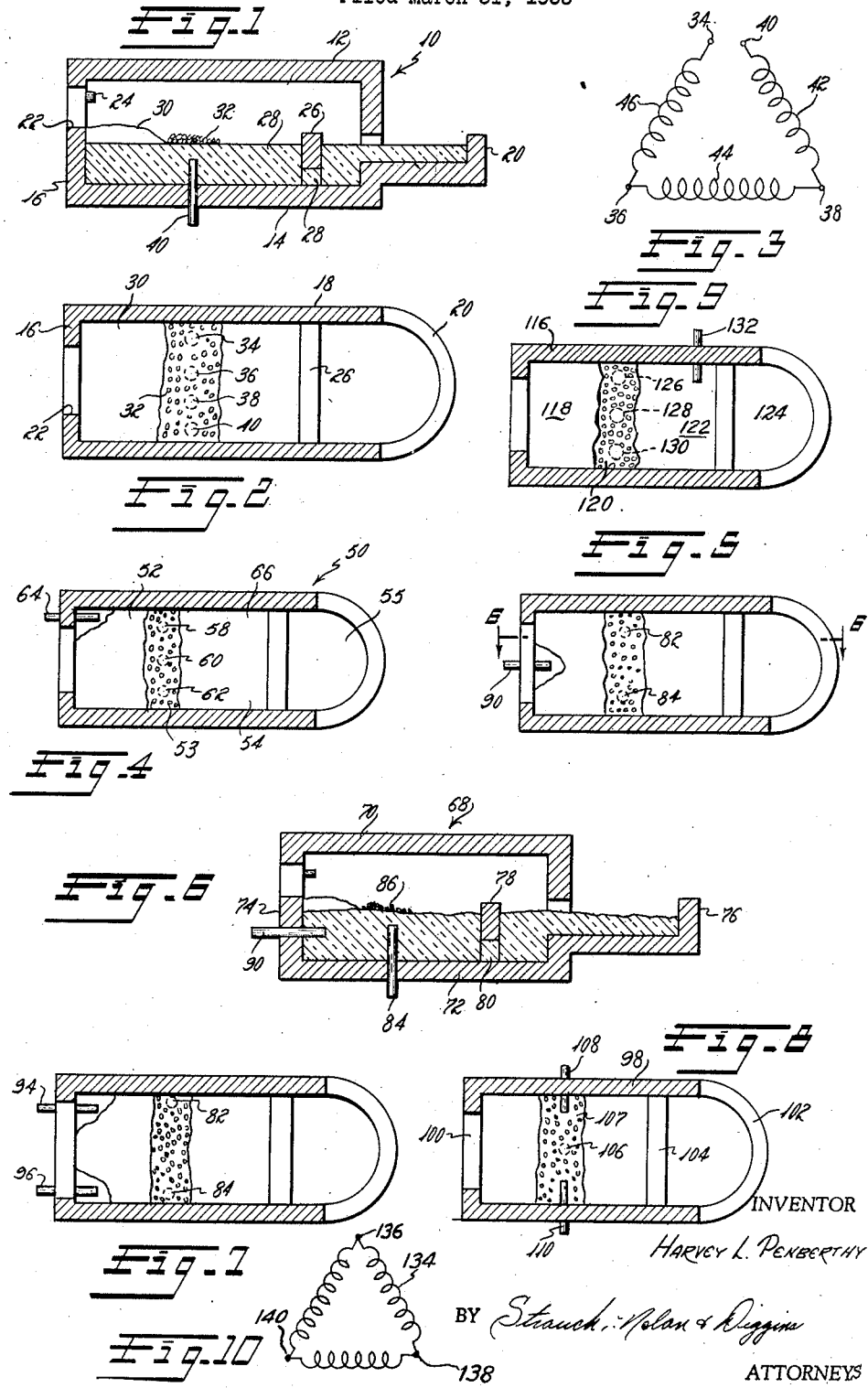
INVENTOR
HARVEY L. PENBERTHY
BY
ATTORNEYS

United States Patent Office 2,832,958
Patented Apr. 29, 1958

2,832,958

METHOD FOR MANUFACTURING GLASS

Harvey L. Penberthy, Seattle, Wash.

Application March 31, 1955, Serial No. 498,324

9 Claims. (Cl. 13—2)

This invention relates to a method and means for manufacturing glass, and relates more particularly to that type of process wherein unmelted batch is introduced into the charging end of a furnace, is melted and then flows from the charging end to the withdrawing end, being fined in the course of its flow through the use of combustion heating either with or without auxiliary Joule effect heating.

In furnaces of this type the flames from gas jets heat the glass by radiation and conduction, and the unmelted batch, which is very much lighter than the molten glass, floats on the surface to form an area which is completely covered with a blanket of batch. By common consent and general usage it has been customary to arbitrarily divide the area of molten glass in a furnace into the melting zone, the fining zone, and the working zone, although it has been recognized that no actual demarkation exists between these areas, except as temperature differences exist. The molten glass in the generally understood melting zone is covered with the batch blanket, which insulates the molten glass and retains it in a cooler and hence more dense condition than the glass which is not so covered or insulated. A certain amount of heat reaches this dense cooler glass through the batch blanket, but primarily this glass is heated by convection currents which flow under the batch blanket.

Somewhat contrary to the generally understood division of the area of a glass furnace into zones, it has been my observation that there is a fourth area or zone present in the tank, which is at least as well defined as the now familiar melting, fining and working zones. Thus I have found that between the generally understood melting zone, which is covered by the batch blanket, and the clear fining zone, there is an area of substantial width which is covered almost solely by foam. Taking a specific example, in a tank thirty feet long fifteen feet of the molten glass might be covered by batch, five feet might be covered by foam, and ten feet might be clear. While the unmelted batch which covers the melting zone acts as an insulator between the heat of combustion and the molten glass which it covers, the batch itself rapidly absorbs heat from the hot gases and can thus be considered a more or less efficient heat receptor. That is to say, the heat which is absorbed by the molten batch is useful in the glass manufacturing process despite the fact that only a small portion of this heat reaches the molten glass beneath the batch.

In contrast to this, I have found that the foam, which covers what I shall call the foam zone, is an almost perfect heat insulator which prevents transfer of heat to the molten glass benath the foam layer. This layer, however, in contrast to the batch, absorbs substantially no useful heat from the hot gases. As a consequence of this I have found that the combustion heat generated in the furnace can be more effectively utilized if either the edge of the foam zone, which I shall call the foam line, is caused to recede to expose additional molten glass to the heat of combustion, or if the extent of the foam zone is shortened while the length of the batch blanket is lengthened to take up the additional space.

This problem of efficiently melting glass has long received the attention of the industry and various attempts have been made at a more efficient introduction of heat. Typical of these attempts has been the use of Joule effect heating under the unmelted batch as is illustrated in Lambert Patent No. 2,636,913, and use of such heating in the fining zone as is illustrated in Grauel Patent No. 1,552,555 and Arbeit Patent No. 2,636,914. Others have utilized Joule effect electrodes in and around the melting zone, although the particular arrangements which they have proposed have been primarily dictated by a desire to prevent unrefined and undissolved particles of glass, known to those versed in the art as "stones," from reaching the working zone and getting into the ware. To this end physical barrier type electrodes have been utilized, and these either extend completely transversely across the tank, or enter the tank vertically at such close spacings as to physically impede the flow of undissolved particles of glass. Attempts were made to localize the heat produced by such electrodes near the surface of the glass and the flow of electrical current through the glass was normally longitudinally of the tank.

While electrodes placed in this manner form a physical obstacle to the escape of raw or partly melted materials, they slow the flow of glass in the melting zone of the furnace and thereby reduce the melting capacity of the furnace in comparison with its fining capacity. This difficulty was recognized and attempts made to overcome it by providing a melting zone having a larger capacity than the fining zone. Although this makes it possible to operate the fining zone at the maximum capacity, it is a solution which can be readily applied only when new tanks are being installed, since it is often economical and physically impossible to modify existing tanks to adopt such an expedient.

A further disadvantage which has been encountered with this type of electrode arrangement is that the heat produced is largely confined to the upper layers of glass immediately beneath the batch blanket. While this tends to prevent the passage of undissolved lumps or particles of batch past these electodes, it fails to provide deep heat beneath the batch blanket, and thus does not eliminate the unequal temperature conditions which exist in the melting zone due to the shading or insulating effect of the batch blanket.

When glass is melted from batch in a conventional furnace by applying heat from a burning fuel over the top of the batch, and by supplying additional heat by passing electric current through the molten glass, theory indicates that the production of an extra ton of glass should require 515 kilowatt hours of electric heat as an absolute minimum for melting and refining. In actual practice a common figure was 700 to 2100 kilowatt hours per ton. I have now found that when utilizing the method of my invention it is possible to produce an additional ton of glass by using only approximately 380 kilowatt hours. I have found that this is possible if at least one vertical electrode is placed in the original foam zone and if current is flowed from such electrode transversely through the glass in the foam zone.

It is accordingly a primary object of the present invention to provide an apparatus and method for manufacturing glass in which current is flowed between at least two Joule effect electrodes in the original foam zone of a glass furnace.

It is another object of this invention to provide an apparatus and method of manufacturing glass in which current is flowed between at least two Joule effect electrodes placed in the zone of the furnace which constitutes the foam zone prior to flowing such current.

It is another object of this invention to provide an apparatus and method for producing glass at a high heat efficiency.

Further objects and advantages of the invention will become apparent upon reference to the following specification, claims and drawings wherein:

Figure 1 shows a vertical section through a glass furnace having electrodes placed therein according to my invention;

Figure 2 is a horizontal section of the glass furnace shown in Figure 1 taken along the line 2—2;

Figure 3 is a diagram of a suitable supply of power for the glass furnace of Figures 1 and 2;

Figure 4 is a horizontal section through a glass furnace according to another embodiment of the invention;

Figure 5 is a vertical section through a glass furnace according to still another embodiment of my invention;

Figure 6 is a horizontal section taken along the line 6—6 of Figure 5;

Figure 7 is a horizontal section through a glass furnace according to still a further embodiment of my invention;

Figure 8 is a horizontal section through a glass furnace according to still a further embodiment of my invention;

Figure 9 is a horizontal section through a glass furnace according to another embodiment of my invention; and Figure 10 is a diagram of a suitable supply of power for the glass furnace of Figure 9.

Referring more particularly to Figures 1 and 2 of the drawings there may be seen a furnace 10 having a crown or roof 12, bottom wall 14, rear wall 16, side walls 18, and working zone extension 20. The rear wall 16 is provided with a suitable aperture 22 for introduction of batch material and is provided with a suitable means for introducing hot gases of combustion including a fuel jet 24. Intermediate the rear wall 16 and working zone extension 20 there is provided a transverse bridge wall 26 having a throat 28 centrally located in the bottom thereof.

In the normal operation of this furnace utilizing combustion heating alone, the melting zone is covered by the batch blanket 30. Immediately adjacent to the melting zone and batch blanket is a portion of the molten glass which is almost completely covered by a layer of foam 32 and this zone of the furnace has been designated the foam zone. Under such conditions the batch blanket 30 tends to insulate the molten glass thereunder from the heat produced above the batch, but the batch itself absorbs heat to bring about a continuous melting thereof. The foam layer 32, however, quite effectively insulates the molten glass thereunder from the heat of combustion and does not itself absorb any substantial amount of useful heat.

According to my invention I provide a plurality of vertical electrodes 34, 36, 38 and 40 which enter the bottom wall 14 of the furnace in the foam zone under the layer of foam 32. These electrodes are connected to the terminals of a supply of power such as the secondary windings 42, 44, 46 of the three phase transformer shown in Figure 3. The transformer windings 42, 44 and 46 are connected in an open delta and have terminals numbered to correspond to the electrodes 34, 36, 38 and 40 to which they are connected. This particular connection provides for transverse current across the tank in the foam zone, and the electrodes act as thermal pumps to send heavy streams of molten glass upward into the layer of foam 32. These rising currents tend to cause the layer of foam 32 to partially disappear and tend to shorten its longitudinal length. When the layer of foam has partially disappeared there is an additional clear surface of molten glass exposed to the heat of combustion in the furnace so that, in addition to the Joule effect heat added by means of the electrodes, a much more efficient utilization is made of the combustion heat. The furnace may be operated in this condition with an abbreviated foam zone, or with a foam line which has receded, so to speak; or alternatively, additional unmelted batch may be added to the furnace to force the foam line back to its original position as seen in Figures 1 and 2. Under these circumstances the longitudinal length of the foam zone is shortened and an additional area of batch is presented to the combustion heat without decreasing the area of the clear fining zone. Since the batch is a much more efficient absorber of heat than the layer of foam, this causes an increase in heat efficiency over and above what would be expected from the mere addition of a given amount of Joule effect power.

Since it is desirable to have the electrodes 34, 36, 38 and 40, or at least a pair of such electrodes, act as thermal pumps to eliminate at least a portion of the foam layer, the electrodes should preferably, though not necessarily, extend upwardly over one-third the depth of the glass and may extend to a terminating position close to the surface of the glass mass. The electrodes should terminate short of the surface, however, and preferably do not extend closer to the surface than a distance equal to approximately one-tenth of the depth of the glass mass.

The hot rising currents which originate at the very bottom of the glass mass, and which reach the surface thereof beneath the layer of foam, cause a deep circulating convection current beneath the batch blanket, which tends to mix the entire mass of glass thereunder. The Joule effect heating thus acts to increase the furnace output in three distinct manners: first there is the increased heat added to the furnace by means of the current passing through the glass between the electrodes, second there is the advantageous mixing of the glass beneath the batch blanket which occurs as a result of the deep thermal pump action of the vertical electrodes, and third there is the alternative advantage of either increasing the clear area of molten glass which is exposed to the combustion heat, or of increasing the area of batch which is exposed to the combustion heat, both of which increase the heat efficiency of the furnace. Thus while the mere addition of electrodes to a glass furnace will ordinarily increase the output thereof by adding additional Joule effect heat, I have found that the efficiency of the furnace may be increased by an unexpectedly high amount if the electrodes are places in the original foam zone of the furnace.

While the electrodes may be of any convenient size and shape, it is desirable that they should produce a high current density in their immediate vicinity, and for this reason plate or block electrodes are unsatisfactory since they are incapable of producing a sufficiently high localized current density to bring about the desired effect. Rod type electrodes of circular or other cross section have been found satisfactory and their diameter or cross sectional dimension is preferably small in relation to the depth of the glass mass. It is also important from the standpoint of increasing the output of the furnace that the electrodes are not too closely spaced so as to form an actual physical barrier to the flow of the glass.

In a preferred form of the invention the uppermost portions of the electrodes are spaced from the surface of the molten glass by a distance equal to at least one-tenth of the depth of the glass bath and the elecrodes are spaced at least approximately ten electrode diameters.

Referring to Figure 4 there is shown a second embodiment of my invention wherein a glass furnace 50 having a melting zone 52, foam zone 53, fining zone 54 and working zone 55 is provided with three vertical electrodes 58, 60 and 62 which are placed in the zone which constitutes the foam zone during combustion heating of the furnace. The electrodes 58, 60 and 62 may be connected to the terminals of a three phase supply of power and sufficient power supplied to cause a decrease in the longitudinal extent of the foam zone.

When utilizing this embodiment of the invention an objectionable unbalance has been caused in the three phase power supply. Thus, if power is supplied by a delta connected three phase transformer, it will be found that the phases 58—60 and 60—62 carry a substantially greater load than the phase 58—62. I have found that this condition may be corrected if an equalizing electrode 64 is placed in the back wall of the furnace, at a distance from electrode 62 approximately equal to the distance between electrodes 58 and 62. The electrode 64 may then be electrically connected to the same terminal of the transformer as electrode 58 and current then flows between electrode 64 and electrodes 60 and 62 which tends to balance the load on the transformer. While the electrode 64 has been shown as being placed under the batch blanket in the corner of the tank, it is also possible to place such a balancing electrode in the fining zone as shown in Figure 9. In this embodiment of the invention a glass furnace 116 having a melting zone 118, foam zone 120, fining zone 122 and working zone 124 is provided with three vertical electrodes 126, 128 and 130 which are placed in the zone which constitutes the foam zone during combustion heating of the furnace. The electrodes 126, 128 and 130 may be connected to the terminals of a three phase supply of power and an equalizing electrode 132 in the fining zone may be connected to the same terminal of the transformer as electrode 126.

In Figures 5 and 6 there is shown a still further embodiment of my invention comprising a glass furnace 68 having a crown or roof 70, a bottom wall 72, rear wall 74, working zone extension 76, and bridge wall 78 having a throat 80. The furnace is provided with a pair of vertical electrodes 82 and 84 which enter the bottom wall 72 in the foam zone 86 of the furnace, and preferably extend upwardly into the furnace over one-third of the depth of the glass mass. According to this embodiment of the invention there is also provided in the rear wall 74 a horizontal electrode 90 which enters the tank preferably above one-third of the depth of the glass mass.

The electrodes 82, 84 and 90 may be connected to a three phase supply of power, and set up Joule effect currents in the tank which follow a substantially delta configuration. There is thus provided the necessary transverse current between electrodes 82 and 84, to provide the desired effect in the foam zone, while the electrode 90 beneath the batch blanket provides for additional heating and mixing of the glass under the batch blanket.

In Figure 7 there is shown a still further embodiment of my invention corresponding to Figure 6, wherein the electrode 90 of Figure 6 has been replaced by a pair of electrodes 94 and 96. In utilizing this form of the invention the electrodes 82, 84, 94 and 96 may be connected to the terminals of a transformer arrangement such as shown in Figure 3, wherein the electrodes 94 and 96 are respectively connected to the terminals 34 and 40 and the electrodes 82 and 84 are connected to the terminals 36 and 38. This particular arrangement has been found very satisfactory since it permits the use of different voltages in the various transformers making up the delta. An alternative for supplying power to the embodiment of the invention shown in Figure 7 comprises the use of a simple three phase supply wherein the electrodes 94 and 96 are connected together to form one terminal thereof. Thus a three phase transformer 134 shown in Figure 10 may have one terminal 136 connected to electrodes 94 and 96, a second terminal 138 connected to electrode 82, and its third terminal 140 connected to electrode 84. In either case the desired transverse current is obtained in the foam zone in addition to increased heating and mixing under the batch blanket.

In Figure 8 there is shown a still further embodiment of my invention, wherein a glass tank 98, having a rear wall 100, working zone extension 102, and bridge wall 104, is provided with a single vertical electrode 106 placed in the foaming zone 107. In addition to the electrode 106 there are provided a pair of horizontal electrodes 108 and 110 entering the side walls of the furnace transversely of electrode 106. The electrodes 108 and 110 are preferably placed in the upper two-thirds of the depth of the glass mass and the electrode 106 preferably extends into such upper two-thirds. These electrodes may be connected to any suitable source of three phase power, or to single phase power, either of which will establish sufficient transverse currents and thermal pumping action to have the desired beneficial effect in the foam zone.

In all figures of the drawing wherein vertical electrodes in the foam zone have been illustrated in plan view, the layer of foam has been broken away to make such electrodes visible. The particular shape of these broken away portions, however, is not intended to represent any accurate picture of the effect of the electrodes upon the layer of foam. While the figures of the drawings all show tanks having bridge walls and throats, which is typical of container tanks, it is to be understood that the desired action may also be utilized to advantage in throatless tanks such as are commonly used in the manufacture of window glass.

From the foregoing it will be seen that I have provided a method and means for producing glass which may be adapted to currently operating glass furnaces to greatly increase their output both through the additional Joule effect heat added and through a more efficient use of the heat of combustion. This increased furnace efficiency is obtained without the necessity for altering the dimensions of the furnace and without the necessity for mounting an unduly great number of electrodes. While certain embodiments of my invention utilize a plurality of vertical electrodes, it has been found that only one such electrode is necessary so long as transverse currents are caused to flow between that electrode and at least one other electrode in the original foam zone. In all cases there must be at least two electrodes in the original foam zone of the furnace and these must establish a transverse current at least a portion of which preferably exists about the one-third level of the depth of the glass mass. Where a single vertical electrode is used it is preferably located remote from the side walls of the tank. The electrodes must be so spaced as to form no physical obstacle to glass flow and must be of relatively small cross section so as to bring about the desired heating and thermal pump effects.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a method of manufacturing glass in a furnace which when heated solely by combustion heat has a melting zone containing unmelted batch, a foam zone contiguous said unmelted batch, a fining zone and a working zone, the steps comprising: heating the glass in at least the melting, foam and fining zones of said furnace by combustion heat, and simultaneously flowing concentrated Joule effect currents transversely from one side of said foam zone to the other, so as to bring substantially the entire width of the foam zone under the influence of said current while the surface of said zone is acted on by said combustion heat.

2. The method of manufacturing glass set out in claim 1 including creating at least one rising columnar current of glass in said foam zone originating at the bottom of the glass and rising to the surface.

3. The method of manufacturing glass set out in claim 1 wherein said concentrated Joule effect currents are flowed between electrodes of the rod type.

4. The method of manufacturing glass set out in claim 3 wherein said currents are flowed between electrodes at least one of which is vertical and enters the bottom of the furnace.

5. The method of manufacturing glass set out in claim 4 wherein said currents are flowed between electrodes having at least a portion thereof in the upper two-thirds of the glass but terminating short of the surface of the glass by a distance of at least one-tenth the depth of the glass.

6. The method of manufacturing glass as set out in claim 3 wherein said currents are flowed between electrodes entering opposite side walls of the furnace.

7. The method of manufacturing glass set out in claim 6 including flowing said currents to a vertical electrode between said electrodes in the side walls of the furnace.

8. The method of manufacturing glass as set out in claim 1 wherein said Joule effect currents are flowed between a pair of vertical electrodes, one of said electrodes entering the floor of the furnace adjacent each side wall of the furnace.

9. The method of manufacturing glass as set out in claim 1 wherein said current flowed through said foam zone is three-phase current, and flowing an auxiliary current through said glass to balance the load on the source of three-phase current supply.

References Cited in the file of this patent

UNITED STATES PATENTS

| | | |
|---|---|---|
| 1,552,559 | Grauel | Sept. 8, 1925 |
| 2,119,949 | Blau et al. | June 7, 1938 |
| 2,277,678 | Borel | Mar. 31, 1942 |
| 2,490,339 | DeVoe | Dec. 6, 1949 |
| 2,523,030 | Labino | Sept. 19, 1950 |
| 2,545,619 | Lambert | Mar. 20, 1951 |
| 2,600,490 | De Voe | June 17, 1952 |
| 2,636,913 | Lambert | Apr. 28, 1953 |
| 2,636,914 | Arbeit | Apr. 28, 1953 |
| 2,658,095 | Arbeit et al. | Nov. 3, 1953 |
| 2,773,111 | Arbeit et al. | Dec. 4, 1956 |